(12) United States Patent
Thomas et al.

(10) Patent No.: US 8,592,538 B2
(45) Date of Patent: Nov. 26, 2013

(54) AZEOTROPES OF METHYL CHLORIDE WITH FLUOROCARBONS

(75) Inventors: Raymond Hilton Thomas, Pendleton, NY (US); Hang T. Pham, Amherst, NY (US); Rajiv Ratna Singh, Getzville, NY (US); Natalie Merrill, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/331,588

(22) Filed: Dec. 20, 2011

(65) Prior Publication Data

US 2013/0158218 A1 Jun. 20, 2013

(51) Int. Cl.
*C08F 4/00* (2006.01)
*C08F 12/20* (2006.01)
*C08F 10/00* (2006.01)

(52) U.S. Cl.
USPC .................. 526/238; 526/242; 526/348.7

(58) Field of Classification Search
USPC ...................... 526/348.7, 238, 242
See application file for complete search history.

(56) References Cited

U.S. PATENT DOCUMENTS

| | | | |
|---|---|---|---|
| 2,999,815 A | 9/1961 | Eiseman, Jr. | |
| 2,999,817 A | 9/1961 | Bower | |
| 3,903,009 A | 9/1975 | Bauer et al. | |
| 5,182,040 A | 1/1993 | Bartlett et al. | |
| 5,294,358 A | 3/1994 | Dantinne et al. | |
| 5,691,431 A | 11/1997 | Chen et al. | |
| 7,084,316 B2 | 8/2006 | Ohno et al. | |
| 7,189,311 B2 | 3/2007 | Clemmer | |
| 2005/0101751 A1 | 5/2005 | Shaffer et al. | |
| 2008/0051612 A1* | 2/2008 | Knapp et al. | 570/178 |
| 2011/0111950 A1* | 5/2011 | Shaffer et al. | 502/155 |

FOREIGN PATENT DOCUMENTS

| | | |
|---|---|---|
| WO | WO 92/06800 A1 | 4/1992 |
| WO | WO 2004/058829 A1 | 7/2004 |
| WO | WO 2010/088196 A2 | 8/2010 |

OTHER PUBLICATIONS

Kim et al., "A Study to Determine the Existence of an Azeotropic R-22 "Drop-In" Substitute," prepared by U.S. Department of Commerce for Electric Power Research Institute, Mar. 1996, pp. 1-45.
Morrison et al., "Azeotropy in Refrigerant Mixtures," International Journal of Refrigeration (1993), vol. 16, No. 2, pp. 129-138.
International Search Report and Written Opinion of the International Searching Authority in counterpart International Application No. PCT/US2012/068937, report dated Mar. 13, 2013.

* cited by examiner

*Primary Examiner* — William Cheung
(74) *Attorney, Agent, or Firm* — Kenyon & Kenyon LLP

(57) ABSTRACT

Azeotropic or azeotrope-like compositions of the present technology include methyl chloride and at least one hydrofluorocarbon or hydrofluoro-olefin. In some examples, the at least one hydrofluorocarbon or hydrofluoro-olefin can be selected from the group consisting of 1,1,1,2-tetrafluoroethane and 1,3,3,3-tetrafluoropropene. The azeotropic or azeotrope-like compositions can be used as solvents or diluents in polymerization processes, including slurry polymerization processes.

10 Claims, No Drawings

AZEOTROPES OF METHYL CHLORIDE WITH FLUOROCARBONS

FIELD OF THE INVENTION

The present technology relates to the production of poly-alpha-olefins (PAOs), polyisobutylenes (PIBs), and copolymers thereof. More particularly, the present technology relates to the use of an azeotropic or azeotrope-like composition, which includes methyl chloride ($CH_3Cl$) and fluorocarbons, as a solvent or diluent in the process of producing polyisobutylene and its copolymers.

DESCRIPTION OF RELATED ART

Methyl chloride is commonly used as a solvent or diluent in the process of producing polyisobutylene and its copolymers. For example, slurry polymerization processes in methyl chloride are used in the production of high molecular weight polyisobutylene and isobutylene-isoprene butyl rubber polymers. Likewise, polymerizations of isobutylene and para-methylstyrene are also conducted using methyl chloride. Similarly, star-branched butyl rubber is also produced using methyl chloride.

Typically, such polymerization processes use methyl chloride at low temperatures, generally lower than $-90°$ C., as the diluent for the reaction mixture. Methyl chloride is employed for a variety of reasons, including that it dissolves the monomers and the catalyst, e.g. aluminum chloride, but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange.

However, there are a number of problems associated with the polymerization in methyl chloride, for example, the tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

SUMMARY OF THE INVENTION

The present technology relates to azeotropic or azeotrope-like compositions that include methyl chloride and at least one hydrofluorocarbon or hydrofluoro-olefin. The azeotropic or azeotrope-like compositions can be used as solvents or diluents in polymerization processes, including slurry polymerization processes.

In one aspect, an azeotropic or azeotrope-like composition is provided that includes, consists essentially of, or consists of, methyl chloride and at least one hydrofluorocarbon or hydrofluoro-olefin. In some examples, the hydrofluorocarbon or hydrofluoro-olefin can be selected from the group consisting of 1,1,1,2-tetrafluoroethane and 1,3,3,3-tetrafluoropropene.

In another aspect, a polymerization medium suitable to polymerize one or more monomers to form a polymer is provided that includes at least one Lewis acid, and a diluent that includes an azeotropic or azeotrope-like composition including consisting essentially of, or consisting of, methyl chloride and at least one hydrofluorocarbon or hydrofluoro-olefin. The hydrofluorocarbon or hydrofluoro-olefin can preferably be selected from the group consisting of 1,1,1,2-tetrafluoroethane and 1,3,3,3-tetrafluoropropene.

In a third aspect, a polymerization process is provided that includes the steps of: providing one or more monomers, and contacting the one or more monomers in a reactor with at least one Lewis acid in the presence of a diluent. The diluent includes an azeotropic or azeotrope-like composition comprising methyl chloride and at least one hydrofluorocarbon or hydrofluoro-olefin. The at least one hydrofluorocarbon or hydrofluoro-olefin can preferably be selected from the group consisting of 1,1,1,2-tetrafluoroethane and 1,3,3,3-tetrafluoropropene.

DETAILED DESCRIPTION

Azeotropic or azeotrope-like compositions of the present technology include, consist essentially of, or consist of, methyl chloride and at least one hydrofluorocarbon or hydrofluoro-olefin. In some examples, the at least one hydrofluorocarbon or hydrofluoro-olefin can be selected from the group consisting of 1,1,1,2-tetrafluoroethanes 1,3,3,3-tetrafluoropropenes. 1,1,1,2-tetrafluoroethanes is also known as R-134a or HFC-134a, and 1,3,3,3-tetrafluoropropene is also known as HFO-1234ze, or R-1234ze. For example, the azeotropic or azeotrope-like composition can include methyl chloride and trans-1,3,3,3-tetrafluoropropene (also known as R1234ze (E)). The azeotropic or azeotrope-like compositions can be used as solvents or diluents in polymerization processes, including slurry polymerization processes. In at least some examples, the azeotropic or azeotrope-like compositions can be used as a solvent or diluent in the production of polymers that can include, for example, polyalpha-olefins (PAOs), polyisobutylenes (PIBs), and copolymers thereof. Nonlimiting examples of such polymers include (poly)isobutylene homopolymers, isobutylene-isoprene (butyl rubber) copolymers, isobutylene and alkylstyrene copolymers, and star-branched butyl rubber terpolymers.

There is concern for the environment in terms of global warming and ozone depletion. Hydrofluorocarbons and hydrofluoro-olefins have zero ODP. The hydrofluoro-olefins suitable for use in the present technology preferably also have a low global warming potential (GWP). For example, the GWP of the hydrofluoro-olefin can be about 150, or less than about 150. For example, 1,3,3,3-tetrafluoropropene has a GWP of about 6. Mixtures of hydrofluorocarbons and hydrofluoro-olefins can have a GWP of about 150 or less.

The hydrofluoro-olefins suitable for use in the present technology preferably also have low global warming potentials (GWP). For example, 1,3,3,3-tetrafluoropropene has a GWP of about 6, on a 100 year time horizon. Preferably, the GWP of any azeotrope would be less than 1000, more preferably less than 500.

The toxicity and flammability of hydrofluorocarbons and hydrofluoro-olefins for use in the present technology is also of concern. Hydrofluoro-olefins, in particular, are often toxic and flammable. Preferably, the hydrofluorocarbons or hydrofluoro-olefins of this invention are non-toxic and non-flammable. For example, 1,3,3,3-tetrafluoropropene is both non-toxic and non-flammable. Additionally, 1,1,1,2-tetrafluoroethane, which is non-flammable, and 1,3,3,3-tetrafluoropropene, which is moderately flammable, can reduce the flammability of the diluent when they are combined with methyl chloride to form an azeotropic or azeotrope-like composition of the present technology.

As used herein, the term "azeotropic or azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

Azeotropic compositions are constant boiling compositions, and azeotrope-like compositions are constant boiling or essentially constant boiling. In other words, for azeotropic and azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotropic or azeotrope-like compositions of the present technology within the indicated ranges, as well as, certain compositions outside these ranges, are azeotrope-like.

The azeotropic or azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotropic or azeotrope-like compositions is that there is a range of compositions containing the same components in varying proportions that are azeotrope-like or constant boiling. All such compositions are intended to be covered by the terms "azeotropic or azeotrope-like" and "constant boiling." As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well-recognized in the art that it is not possible to predict the formation of azeotropes, as indicated, for example, in U.S. Pat. No. 5,648,017 (column 3, lines 64-65) and U.S. Pat. No. 5,182,040 (column 3, lines 62-63), both of which are incorporated herein by reference. Applicants have discovered unexpectedly that methyl chloride and certain fluorocarbons, particularly hydrofluorocarbons (HFCs), form azeotropic and azeotrope-like compositions.

According to certain preferred embodiments, the azeotropic or azeotrope-like compositions of the present technology comprise, and consist essentially of, or consist of, effective amounts of methyl chloride and at least one hydrofluorocarbon or hydrofluoro-olefin, which can be selected from the group consisting of 1,1,1,2-tetrafluoroethane and 1,3,3,3-tetrafluoropropene. The term "effective amounts" as used herein refers to the amount of each component which, upon combination with the other component, results in the formation of an azeotropic or azeotrope-like composition. Any of a wide variety of methods known in the art for combining the components to form a composition can be adapted for use in the present methods to produce an azeotropic or azeotrope-like composition. For example, methyl chloride and the at least one hydrofluorocarbon or hydrofluoro-olefin can be mixed, blended, or otherwise contacted by hand and/or by machine, as part of a batch or continuous reaction and/or process, or via combinations of two or more such steps. In light of the disclosure herein, those of skill in the art will be readily able to prepare azeotropic or azeotrope-like compositions according to the present technology without undue experimentation.

In examples where azeotropic or azeotrope-like compositions of the present technology comprise, consist essentially of, or consist of, methyl chloride and 1,1,1,2-tetrafluoroethane, the 1,1,1,2-tetrafluoroethane can be present in an amount from about 50% by weight of the composition to about 99.5% by weight of the composition, including for example from about 54% by weight of the composition to about 81% by weight of the composition, or from about 54% by weight of the composition to about 78% by weight of the composition. As illustrated more fully in Example 1 below, the azeotrope has been found to occur when the 1,1,1,2-tetrafluoroethane is present in an amount from about 63% by weight of the composition to about 64% by weight of the composition, which was experimentally measured to be at 63.4% by weight of the composition. The boiling point of the azeotrope was experimentally measured to be at about −29.81° C. at a pressure of about 1 atmosphere.

In examples where azeotropic or azeotrope-like compositions of the present technology comprise, consist essentially of, or consist of, methyl chloride and 1,3,3,3-tetrafluoropropene, the 1,3,3,3-tetrafluoropropene can be present in an amount from about 47% by weight of the composition to about 99.7% by weight of the composition, including for example from about 55.5% by weight of the composition to about 80% by weight of the composition, or from about 65% by weight of the composition to about 80% by weight of the composition. As illustrated more fully in Example 3 below, the azeotrope has been found to occur when the 1,3,3,3-tetrafluoropropene is present in an amount of about from about 65% by weight of the composition to about 66% by weight of the composition, which was experimentally measured to be at 65.5% by weight of the composition. The boiling point of the azeotrope was experimentally measured to be at about −26.288° C. at a pressure of about 1 atmosphere.

As used herein, the term "about" refers to an approximate amount that falls within an acceptable range of experimental error. For example, with respect to percentages by weight, the term "about" can refer to the stated amount plus or minus 0.5% by weight of the composition. Additionally with respect to temperature, the term "about" can mean the stated temperature plus or minus 0.05° C.

Azeotropic or azeotrope-like compositions of the present technology can be used in polymerization mediums suitable to polymerize one or more monomers to form a polymer. For example, a polymerization medium can include at least one catalysts and a diluent that comprises an azeotropic or azeotrope-like composition of the present technology. The azeotropic or azeotrope-like composition can comprise methyl chloride and at least one hydrofluorocarbon or hydrofluoro-olefin, which can be selected from the group consisting of 1,1,1,2-tetrafluoroethane and 1,3,3,3-tetrafluoropropene. Preferably, the at least one catalyst is a Lewis acid, including but not limited to Lewis acids comprising aluminum, boron, gallium, or indium. For example, alkyl aluminum halides, boron halides, and organo-boron halides can be suitable catalysts. Some additional non-limiting examples of suitable Lewis acids is provided in U.S. Patent Application Publication No. 2005/0101751, the disclosure of which is hereby incorporated by reference.

Azeotropic or azeotrope-like compositions of the present technology can be used in polymerization processes to produce polymers of one or more monomers. Such a polymerization process can include, for example, providing one or more monomers, and contacting the one or more monomers in a reactor with at least one catalyst in the presence of a diluent that includes an azeotropic or azeotrope-like composition of the present technology. The azeotropic or azeotrope-like composition can comprise methyl chloride and at least one hydrofluorocarbon or hydrofluoro-olefin, which can be selected from the group consisting of 1,1,1,2-tetrafluoroethane and 1,3,3,3-tetrafluoropropene. In at least some examples, the polymerization processes can be carried out at temperatures of about −50° C. and below.

Azeotropic or azeotrope-like compositions of methyl chloride and at least one hydrofluorocarbon or hydrofluoro-olefin as described herein can be advantageous in polymerization processes because the polymer tends to be much less soluble in the azeotropic or azeotrope-like compositions described herein than it is in methyl chloride alone. Accordingly, precipitation of the polymer can be facilitated and promoted when azeotropic or azeotrope-like compositions of the present technology are used as a diluent. Additionally, methyl chloride boils at −24.2° C. The azeotropic or azeotrope-like compositions described herein boil at lower temperatures, and therefore can allow for operating at a lower temperature as one approaches atmospheric pressure. Further, since the azeotropic or azeotrope-like compositions described herein do not fractionate, they can be more easily separated and removed from the desired polymer product. In some examples, use of an azeotropic or azeotrope-like compositions described herein as a diluent in a polymerization process can also result in the production of higher molecular weight polymers at the same temperature and catalyst conditions as compared to processes using simply methyl chloride.

EXAMPLE 1

An ebulliometer composed of a vacuum jacketed tube with a condenser on top of which was further equipped with a quartz thermometer. About 18 grams of 1,1,1,2-tetrafluoroethane was charged into the ebulliometer and the boiling point was observed. Methyl chloride was then added in small increments, and the boiling point of the compositions was observed as the weight percentage of methyl chloride was increased. A temperature depression was observed at about −29.81° C., indicating a binary minimum boiling azeotrope. The results are shown in Table 1.

TABLE 1

| Wt % R134a | Wt % CH$_3$Cl | T(° C.) |
|---|---|---|
| 100.0 | 0.0 | −26.95 |
| 99.5 | 0.5 | −26.97 |
| 95.9 | 4.1 | −27.56 |
| 88.2 | 11.8 | −28.03 |
| 81.8 | 18.2 | −28.76 |
| 77.5 | 22.5 | −29.32 |
| 71.6 | 28.4 | −29.71 |
| 68.8 | 31.2 | −29.83 |
| 63.4 | 36.6 | −29.81 |
| 59.1 | 41.0 | −29.76 |
| 54.3 | 45.7 | −29.67 |

EXAMPLE 2

The miscibility characteristics of the R134a. OPANOL brand polyisobutylene (MW 36000) and hexane were tested over the temperature range of −60° C. to 50° C. with the results shown in Table 2.

TABLE 2

| R134a | PIB | Hexane | Temp ° C. |
|---|---|---|---|
| 17.70 | 15.86 | 66.44 | −40 |
| 65.69 | 6.61 | 27.70 | 2 liquid phases |
| 44.24 | 10.74 | 45.01 | 2 liquid phases |
| 31.20 | 13.26 | 55.54 | 2 liquid phases |
| 25.00 | 14.45 | 60.55 | 0 |

The first composition in Table 2 was miscible above −40° C. and immiscible below that temperature. The last composition in Table 2 was miscible above 0° C. and immiscible below that temperature. For the other three compositions, there was immiscibility over the temperature range of −60° C. to 50° C.

EXAMPLE 3

An ebulliometer composed of a vacuum jacketed tube with a condenser on top of which was further equipped with a quartz thermometer. About 12 grams of R-1234ze(E) was charged into the ebulliometer and the boiling point was observed. Methyl chloride was then added in small increments, and the boiling point of the compositions was observed as the weight percentage of methyl chloride was increased. A temperature depression was observed at about −26.288° C., indicating a binary minimum boiling azeotrope. The results are shown in Table 3.

TABLE 3

| Wt % CH3Cl | Wt % 1234ze(E) | T(° C.) |
|---|---|---|
| 100.0 | 0.0 | −24.127 |
| 99.7 | 0.3 | −25.343 |
| 90.0 | 10.1 | −25.815 |
| 79.9 | 20.1 | −26.114 |
| 76.8 | 23.2 | −26.129 |
| 70.0 | 30.0 | −25.251 |
| 65.5 | 34.5 | −26.288 |
| 55.6 | 44.4 | −25.684 |
| 46.9 | 53.1 | −25.250 |
| 42.2 | 57.8 | −29.079 |

EXAMPLE 4

The miscibility characteristics of R-1234ze(E), OPANOL brand polyisobutylene (MW 36000) and hexane were tested over the temperature range of −60° C. to 50° C. with the results shown in Table 4.

TABLE 4

| 1234ze | PIB | Hexane | Temp ° C. |
|---|---|---|---|
| 25.00 | 14.45 | 60.55 | −40 |
| 31.85 | 13.13 | 55.02 | 5 |

The first composition was miscible above −40° C. and immiscible below that temperature. The second composition was miscible above 5° C. and immiscible below that temperature. It is noted that both compositions are immiscible at temperatures below about −40° C., which is where the polymerization reactions are typically carried out. It has been determined that increasing the ratio of R-1234ze(E) in the compositions of R-1234ze(E), polyisobutylene and hexane of this example will increase the temperature range over which there are two liquid phases. This can be very useful in the polymerization of polyalpha-olefins and polyisobutylenes.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An azeotropic or azeotrope-like composition comprising methyl chloride and at least one hydrofluorocarbon or hydrofluoro-olefin, wherein the at least one hydrofluorocarbon or hydrofluoro-olefin is selected from the group consisting of:
   (1) 1,1,1,3-tetrafluoroethane in an amount from about 54% by weight of the composition to about 81% by weight of the composition, and
   (2) 1,3,3,3-tetrafluoropropene in an amount from about 47% by weight of the composition to 99.7% by weight of the composition.

2. The azeotropic or azeotrope-like composition of claim 1, wherein the composition comprises 1,1,1,3-tetrafluoroethane in an amount from about 54% by weight of the composition to about 81% by weight of the composition.

3. The azeotropic or azeotrope-like composition of claim 2, wherein the composition comprises 1,1,1,3-tetrafluoroethane in an amount from about 54% by weight of the composition to about 78% by weight of the composition.

4. The azeotropic or azeotrope-like composition of claim 1, wherein the composition comprises 1,3,3,3-tetrafluoropropene in an amount from about 47% by weight of the composition to 99.7% by weight of the composition.

5. The azeotropic or azeotrope-like composition of claim 4; wherein the composition comprises 1,3,3,3-tetrafluoropropene in an amount from about 55.5% by weight of the composition to about 80% by weight of the composition.

6. The azeotropic or azeotrope-like composition of claim 5, wherein the composition comprises 1,3,3,3-tetrafluoropropene in an amount from about 65% by weight of the composition to about 80% by weight of the composition.

7. A polymerization medium suitable to polymerize one or more monomers to form a polymer, the polymerization medium comprising:
   at least one catalyst; and
   a diluent that includes the azeotropic or azeotrope-like composition of claim 1.

8. The polymerization medium of claim 7, wherein at least one catalyst is a Lewis acid.

9. A polymerization process comprising the steps of:
   providing one or more monomers;
   contacting the one or more monomers in a reactor with at least one catalyst in the presence of a diluent, wherein the diluent includes the azeotropic or azeotrope-like composition of claim 1.

10. The polymerization process of claim 9, wherein at least one catalyst is a Lewis acid.

* * * * *